(No Model.)
J. L. KREIDER.
AUTOMATIC GATE.
No. 589,837.　　　　　　　　　　Patented Sept. 14, 1897.
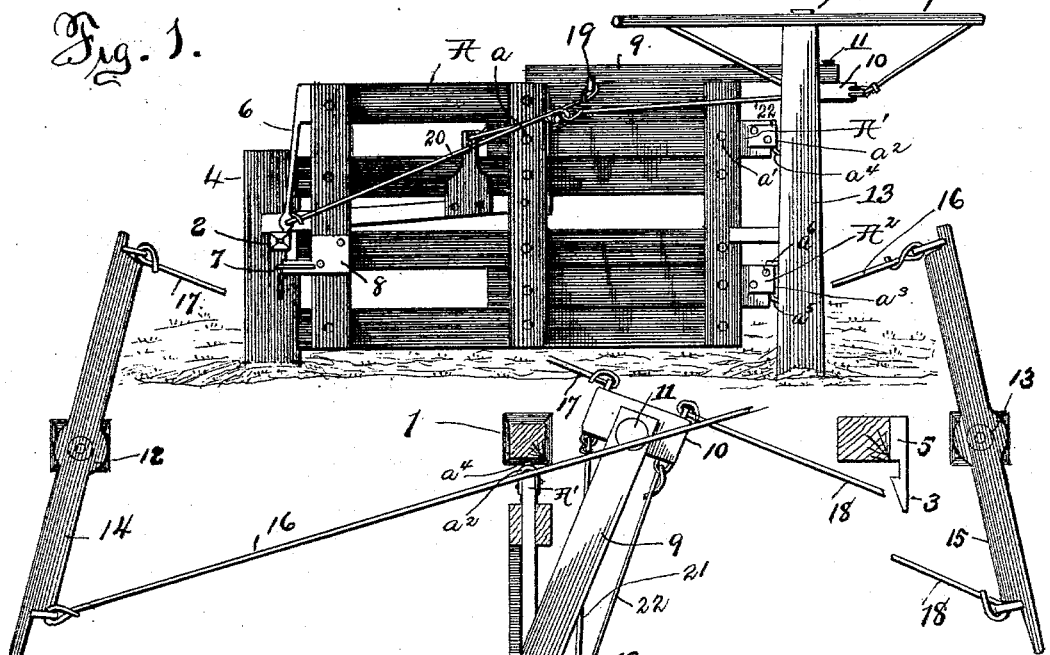
Fig. 1.
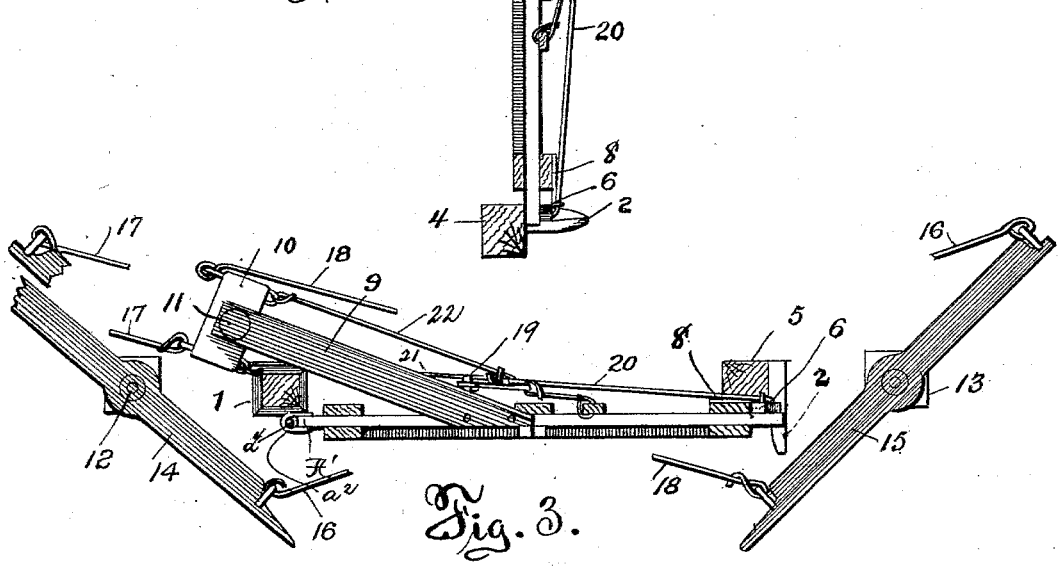
Fig. 2.
Fig. 3.
Witnesses
Henry Hills.
K. C. Nau.
Inventor,
John L. Kreider,
by John Wedderburn
Attorney

UNITED STATES PATENT OFFICE.

JOHN L. KREIDER, OF INDIAN GROVE, MISSOURI.

AUTOMATIC GATE.

SPECIFICATION forming part of Letters Patent No. 589,837, dated September 14, 1897.

Application filed June 12, 1896. Serial No. 595,258. (No model.)

*To all whom it may concern:*

Be it known that I, JOHN L. KREIDER, a citizen of the United States, residing at Indian Grove, in the county of Chariton and State of Missouri, have invented certain new and useful Improvements in Automatic Gates; and I do hereby declare the following to be a full, clear, and exact description of the invention, such as will enable others skilled in the art to which it appertains to make and use the same.

This invention relates to automatic gates.

My object is to provide simple, cheap, and easily-operated mechanism which may be readily applied to an ordinary farm-gate and be adapted to open and close the same automatically.

The invention consists of those novel features and combinations which appear more fully in the following description and claim.

In the accompanying drawings, Figure 1 is a front elevation showing the gate closed; Fig. 2, a plan view showing the gate closed; and Fig. 3, a like view as the preceding figure, but showing the gate open.

An ordinary farm-gate A is hinged to a gate-post 1 by an improved hinge connection, which will now be described.

A' and A² designate upper and lower hinge-bars which slide in between the fixed bars of the gate and are held in position by sets of pins $a$ and $a'$. The ends of these hinge-bars are provided with metal hinge-loops $a^2$ and $a^3$, respectively. These loops encircle the vertical portions of hinge-pivots $a^4$ and $a^5$, which are connected to the gate-post 1. A bolt or pin $a^6$ projects out over the lower hinge-pivot to prevent the gate from coming off.

This gate carries latch or catch mechanism which is adapted for engagement with respective catches 2 and 3, connected to additional gate-posts 4 and 5, which serve to hold the gate closed or open, respectively. A spring-latch 6 has its upper end secured to the gate and its lower free end adapted for engagement with the catches 2 and 3. The outward movement of this latch is limited by a cross-piece 7, fastened to arms 8 that straddle the latch.

In some instances I prefer to employ a gravity latch-bar in place of the spring-latch.

An inclined arm 9 has one of its ends securely fastened to the gate and projects out rearwardly, in the manner shown. A pivot-block 10 is connected to the outer end of the arm by a vertical bolt 11.

The numerals 12 and 13 represent posts which are situated on opposite sides of the gate. Respective tripping arms or levers 14 and 15 are pivoted to the tops of these posts. When the gate is open, the tripping-arms converge in one direction and when closed in the opposite direction. The front end of one tripping-arm and the rear end of the other tripping-arm are connected by a wire 16. The other ends of the arms are connected to the pivot-block by respective wires 17 and 18. A link 19 is pivoted to the arm 9. A wire 20 connects this link to the spring-latch. Two additional wires 21 and 22 connect the link to corners of the pivot-block, as shown.

It will be seen that owing to the employment of the link and the two wires 21 and 22, which connect with the corners of the pivot-block, the said block will be actuated and the latch released whether the pivot-block turns in one direction or the other. Hence an unlocking action of the gate can be had when said gate is closed or swung open and latched.

The operation is as follows: If the gate is closed and a vehicle approaching, when the driver catches the tripping end of either tripping-lever the latter will be moved toward the gate. A pull will then be exerted on the pivot-block and the latter rocked. The rocking of the pivot-block causes a pull to be exerted on one of the wires that connect it to the link 19, whereupon the spring-latch will be retracted. The continued movement of the tripping-lever causes a pull to be exerted on the inclined arm 9, whereupon the gate swings open and the latches are thrown into engagement with the catch on the gate-post at the side of the road. When the vehicle has passed through the gateway and the driver has moved the other tripping-lever, the operation is reversed and the gate closed. When a load of hay is passing through the gate, it is driven against the respective tripping-levers.

Having thus described the invention, what is claimed as new is—

In an automatic gate, the combination with a swinging gate, of a latch connected to the gate, a gate-post provided with a catch adapted for engagement with the latch when the gate is closed, a second gate-post adapted for engagement with the latch when the gate is open, a pivot-block pivoted to the gate, a link also pivoted to the gate independently of the pivot-block which has a depending portion, wires or equivalent devices connected to the pivot-block on opposite sides of its pivotal point and also connected to the depending portion of the link, a wire connecting the depending portion of the link to the latch, pivoted tripping-levers located on opposite sides of the gate, a wire connecting the tripping-levers to each other and wires also connecting said levers to the pivot-block, said parts being so disposed and related that movement of either lever in one direction will unlatch the gate, swing it open and latch it to the second gate-post and a movement in the opposite direction will unlatch the gate from the second gate-post, close said gate and latch it to the first-named gate-post.

In testimony whereof I have signed this specification in the presence of two subscribing witnesses.

JOHN L. KREIDER.

Witnesses:
H. Y. SHUPE,
CECIL WAYLAND.